Aug. 17, 1965 L. E. MILLS 3,200,991
BEVERAGE DISPENSER
Filed Feb. 17, 1961 3 Sheets-Sheet 1
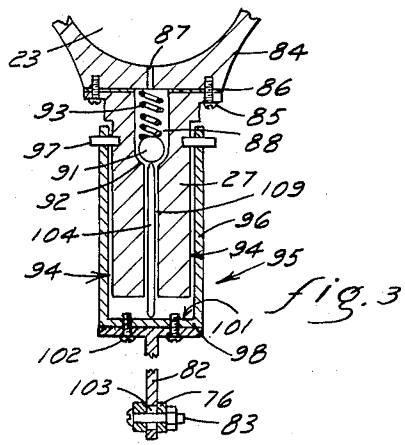
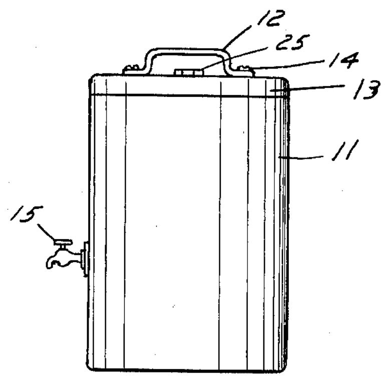
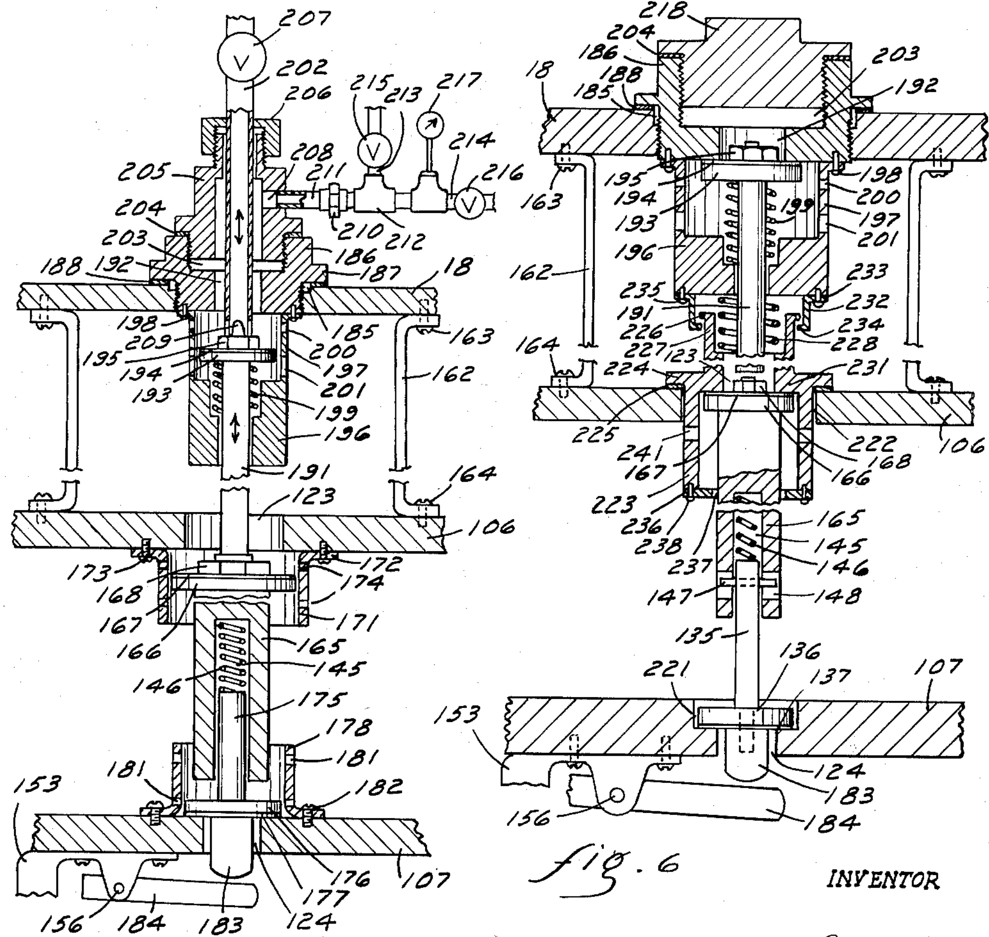
INVENTOR
Lindley E. Mills

BEVERAGE DISPENSER

Filed Feb. 17, 1961

INVENTOR

Lindley E. Mills

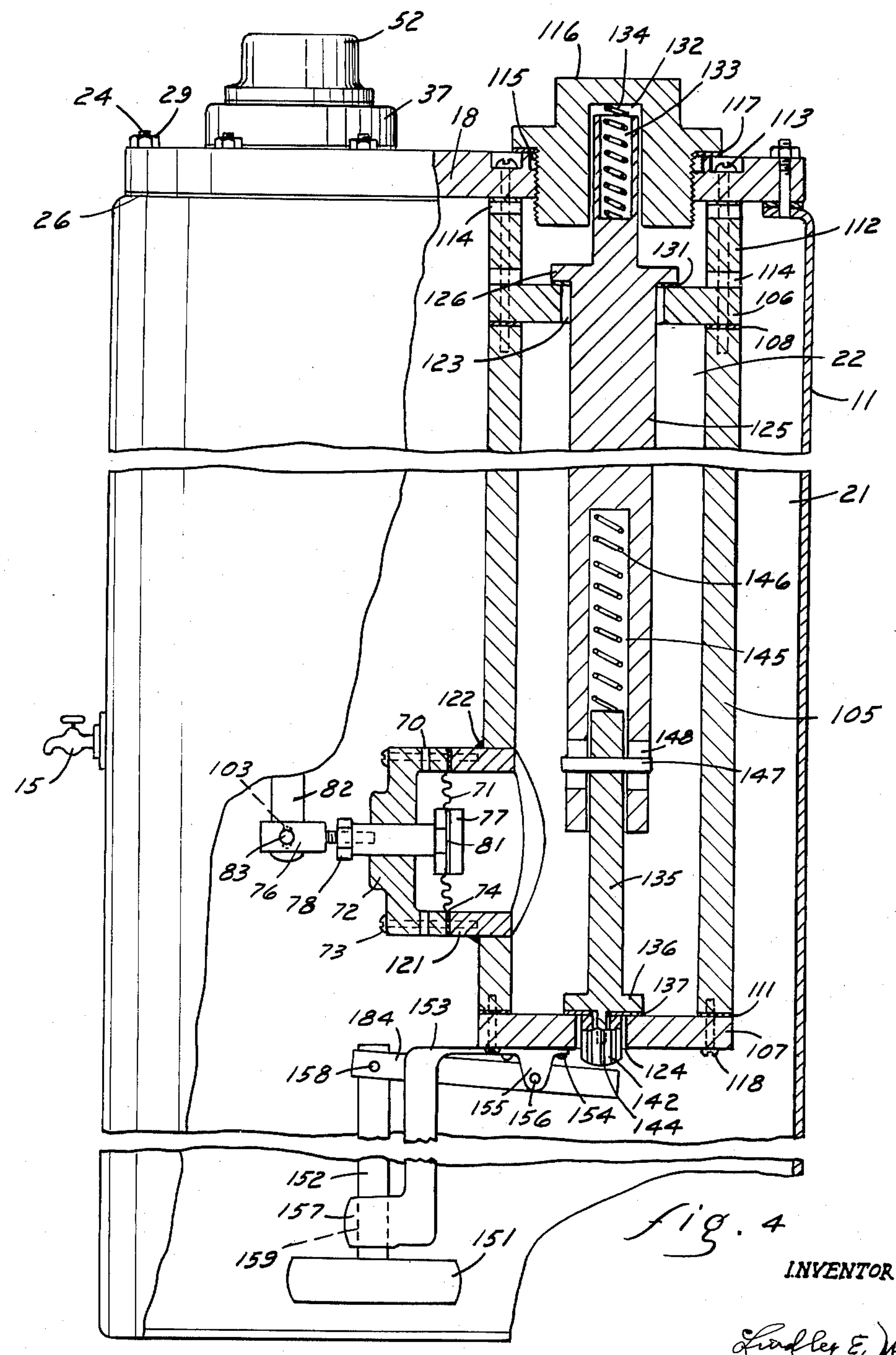
INVENTOR
Lindley E. Mills

United States Patent Office 3,200,991
Patented Aug. 17, 1965

3,200,991
BEVERAGE DISPENSER
Lindley E. Mills, 518 Pinehurst Blvd., Kalamazoo, Mich.
Filed Feb. 17, 1961, Ser. No. 99,655
8 Claims. (Cl. 222—52)

This application is a continuation-in-part of application Serial No. 73,667, now Patent No. 3,128,019, filed Dec. 5, 1960.

This invention relates to a dispenser for liquid products, particularly to a portable dispenser for carbonated beverages in which the degree of carbonation of the beverage can be maintained essentially constant throughout the dispensing of the beverage.

Many beverages, such as certain soft drinks, beer, ale and the like, contain dissolved carbon dioxide. In general, the proportion of dissolved carbon dioxide in the beverage is fairly critical and, for best results, should be maintained within relatively narrow limits even though the limits may vary from beverage to beverage. In the case of some beverages the optimum proportion of dissolved carbon dioxide is such that a temperature slightly above the freezing temperature of the beverage, e.g. at a temperature of approximately 32° F. or slightly below, the beverage can be transferred from one container to another under atmospheric pressure without appreciable loss of carbon dioxide. Such beverages often exert a pressure of from roughly 8 to 15 lbs. per sq. in. at a typical dispensing temperature of approximately 40° F. because of the increased tendency of the dissolved carbon dioxide to vaporize as the temperature of the beverage increases and cannot, of course, be transferred from one container to another at such higher temperatures under atmospheric pressure without serious loss of carbon dioxide. Other beverages may contain sufficient dissolved carbon dioxide to exert more than atmospheric pressure at temperatures near the freezing temperature of the beverage. In such cases the beverage must be transferred from container to container only while under more than atmospheric pressure regardless of its temperature. It is not generally practical to cool carbonated beverages to much below 32° F. since they do not, in general, contain a sufficient proportion of dissolved substances to prevent freezing at temperatures much below 32° F. Carbonated beverages which are served when chilled are generally served at a temperature of approximately 40° F. and in practically every instance the carbonated beverage exerts at this temperature a pressure greater than atmospheric pressure.

As pointed out at some length in the parent application, elaborate means are provided in commercial establishments which sell large numbers of servings of carbonated beverages to insure the proper degree of carbonation of the beverage at the time it is dispensed for consumption. Carbonated beverages are generally furnished to such establishments in barrels, kegs or other containers having a capacity of several gallons and the beverage is dispensed directly from such containers by way of suitable piping and dispensing valves. To insure the proper degree of carbonation of the beverage in the container at all times, permanent installations of tanks or cylinders of carbon dioxide under high pressure, usually in the neighborhood of 1,000 to 1200 lbs. per sq. in., together with suitable elaborate and costly reducing valves, are provided and arranged so that as carbonated beverage is dispensed from the barrel or container additional gaseous carbon dioxide is admitted to the container to maintain the pressure therein as nearly constant as possible. Such installations are obviously of a permanent, nonportable nature and involve costly equipment which can be afforded only by commercial establishments selling large numbers of servings of a beverage.

In addition to the consumption of carbonated beverages in commercial establishments equipped with permanent installations of the type just referred to for dispensing such beverages, large volumes of carbonated beverages of all kinds are consumed in the home and in other locations where the provision of costly permanent installations of the type referred to is neither practical nor economical. It is not practical to furnish carbonated beverages for consumption in the home and the like in easily portable containers, e.g. in containers holding two or three gallons of the beverage, and to then simply draw off the beverage from the container as desired for use. When this is done the vapor space in the container increases gradually as liquid beverage is dispensed and carbon dioxide vaporizes from the liquid beverage remaining in the container to maintain the pressure equilibrium of the carbon dioxide in dissolved and vapor form. As this process is continued, more and more carbon dioxide vaporizes from the liquid and the pressure in the container becomes less and less until eventually the liquid beverage remaining in the container is carbonated to such a low degree that it is unpalatable. In this way as much as 10 to 15 percent, or even more, of the beverage originally in the container becomes unusable and must be discarded.

For this and other reasons carbonated beverages to be consumed in other than commercial establishments where a permanent pressuring system can be installed have heretofore invariably been furnished in small containers, such as cans or bottles, containing a single, or at most a very few, servings of the beverage. Such containers are chilled and opened when needed and all of the beverage in any single container is consumed as soon as practical thereafter without any attempt being made to consume a part of the beverage from the opened container and to save the rest for consumption at a later time. It is clear that this procedure adds immensely to the cost and inconvenience of distributing carbonated beverages intended for consumption away from commercial establishments. When containers are employed which are intended to be discarded when empty, the cost of the container is often as much as, and sometimes more than the cost of the small amount of beverage which it contains. If containers are employed which are returnable for credit, the inconvenience of collecting and returning them is well known. In addition, the difficulty and cost of packing, handling and transporting large numbers of such filled small containers adds greatly to the cost of the product.

Even though it has long been recognized that it would be of considerable advantage for a consumer to be able to purchase a carbonated beverage in a dispensing container which would be small enough to be truly portable but which would, at the same time, be large enough to hold a several days', or even several weeks', supply of the beverage, no satisfatcory arrangement for doing this has heretofore been proposed. Such a dispenser could conveniently hold from two to four gallons of the beverage and could conveniently be of a type which could be refilled with the beverage when empty. Ideally, such a dispnser could be adapted to be positioned in a household refrigerator over the period of usage of the beverage therefrom. It should at all times maintain a satisfactory degree of carbonation of the beverage. Such an arrangement would eliminate entirely the expense and waste inherent in the use of disposable containers and, since only one relatively large but easily portable container would be involved, would overcome almost entirely the nuisance and inconvenience of assembling and returning for credit a large number of small containers. It is also clear that means for providing a properly chilled carbonated beverage at all times "on tap" without the necessity of opening small containers would undoubtedly lead to an increase in consumption of the beverage in the home and similar places.

As has also been pointed out in the parent application, a principal reason why no portable dispenser for a carbonated beverage has come into general use has been the difficulty of providing suitable apparatus for maintaining the degree of carbonation of the beverage in the dispenser at the required value during the dispensing of all the beverage. It is clear that any system involving the use of containers of carbon dioxide under extremely high pressure, with the attendant employment of the presently necessary costly and cumbersome reducing valves, would not constitute a solution of the problem. It is also clear that any provision for maintaining the proper degree of carbonation of a carbonated beverage in a portable dispenser must be an integral part of the dispenser and portable along with it and that the entire apparatus should be as free from the possibility of misuse as possible.

In the parent application there is described and claimed, generally, a portable dispenser for carbonated beverages which comprises an integral, portable unit comprising a chamber for a carbonated beverage and a chamber for carbon dioxide gas. The carbon dioxide gas chamber is large enough to hold an amount of carbon dioxide gas under a moderate pressure sufficient to fill both the gas and beverage chambers with gaseous carbon dioxide at the dispensing temperature and pressure. An arrangement is provided for releasing carbon dioxide gas from the carbon dioxide chamber into the beverage chamber as beverage is drawn from the latter at a rate sufficient to maintain the pressure in the beverage chamber, and, therefore, the degree of carbonation of the beverage remaining therein, essentially constant until all of the beverage has been dispensed. In a particular modification of the arrangement for releasing carbon dioxide from the carbon dioxide chamber into the beverage chamber a suitable diaphragm chamber is also provided, one wall of which comprises a flexible diaphragm. The diaphragm is subjected on one side to the pressure in the diaphragm chamber and, on the other side, to the pressure in the beverage chamber. The diaphragm chamber side of the diaphragm is usually subject to a combination of the pressure of a diaphragm spring and of a gas, e.g. air, which may be at atmospheric pressure or at a pressure higher or lower than atmospheric pressure. The combined pressure of the gas and spring on the diaphragm chamber side of the diaphragm is adjusted so that it is essentially equal to the pressure exerted by the properly carbonated beverage in the beverage chamber at the dispensing temperature. It follows that, when beverage is dispensed at the dispensing temperature from the beverage chamber, the pressure in the beverage chamber begins to fall and the pressures on the two sides of the diaphragm become unequal, causing the diaphragm to flex in the direction of the beverage chamber. By a suitable arrangement of members, the flexing of the diaphragm in this direction leads to a slight opening of the carbon dioxide release valve in the wall of the carbon dioxide chamber allowing carbon dioxide to flow into the beverage chamber, thus restoring the pressure therein to the dispensing pressure and reclosing the valve. In this way this modification of the apparatus of the parent application provides for the dispensing of essentially all of the carbonated beverage from the beverage chamber at the dispensing temperature at essentially the same degree of carbonation.

The foregoing particular modification of the parent application, which is also claimed specifically therein, functions most advantageously when arrangements, mechanical or otherwise, are provided to prevent the diaphragm from flexing to open the carbon dioxide valve during charging of the apparatus with carbonated beverage and with carbon dioxide and until such time as the dispenser and contents have attained the temperature at which it is intended that the beverage be dispensed. If such an arrangement is not provided, it has been noted that, since the pressure exerted by a particular beverage on the beverage chamber side of the diaphragm is dependent upon temperature whereas the pressure exerted on the opposite side of the diaphragm is either independent of temperature or dependent thereon to a lesser degree than the pressure exerted on it by the beverage, there is some likelihood that at temperatures below the dispensing temperature the beverage will become somewhat overcarbonated. Also, should a considerable proportion of the beverage be dispensed at a temperature higher than the dispensing temperature for which the modification is set to function best, there is some likelihood that the beverage will become somewhat undercarbonated. Although both of these conditions are self-correcting as soon as the proper dispensing temperature is attained in the apparatus, it will be aparent that it is highly desirable to provide means for regulating the release of carbon dioxide into the beverage chamber which is self compensating with respect to temperature so that, regardless of the temperature of the beverage in the beverage chamber, its degree of carbonation will be maintained at essentially the same constant optimum degree for the particular beverage concerned.

A further modification of the portable dispenser of the parent application, with which further modification this application is particularly concerned, accomplishes the temperature compensation just referred to by providing a regulating or diaphragm chamber which, instead of being filled with a gas, such as air, is filled with a carbonated liquid, e.g. carbonated water or a portion of the carbonated beverage itself, having a pressure-temperature relationship essentially the same as the beverage being dispensed. The beverage and diaphragm chambers are properly located with respect to one another to provide for free heat interchange between them to insure the beverage in the beverage chamber and the liquid in the diaphragm chamber being at all times at as nearly the same temperature as possible, e.g. by locating the diaphragm chamber inside the beverage chamber where its wall is in direct contact with the contents thereof. Under such conditions, the pressures on the two sides of the diaphragm will be essentially the same regardless of the temperature so long as the proper degree of carbonation of the beverage in the beverage chamber is maintained. Upon dispensing a portion of the beverage from the beverage chamber, again without regard to the temperature at which the dispensing occurs, the pressure in the beverage chamber will become less than the pressure in the diaphragm chamber and the carbon dioxide valve will be opened by the flexing of the diaphragm as before, causing the pressure in the beverage chamber to be restored to essentially the pressure in the diaphragm chamber.

It will be observed as the description proceeds that the modification of this application avoids entirely the use of a spring to assist in pressuring the diaphragm chamber side of the diaphragm. The necessity for the accurate adjustment of the tension exerted by such a spring to insure the proper functioning of the apparatus is thus also avoided. Furthermore, in the modification with which this application is concerned, it is unnecessary to provide means for preventing flexing of the diaphragm and the opening of the carbon dioxide release valve while charging the apparatus with carbonated beverage and with carbon dioxide. In addition, by a suitable arrangement of the parts in the latter modification, as will be explained, a portion of the beverage which may be contained in the diaphragm chamber as the regulating liquid can be dispensed, along with the beverage from the beverage chamber, in useable form, thus increasing the useful capacity of the beverage chamber accordingly.

The modification of this application in which a portion of the beverage is used as the regulating liquid can be employed for the dispensing of any carbonated beverage without readjustment after its employment for the dispensing of a different carbonated beverage, even though the two beverages are carbonated to different degrees and exert different pressures at the same temperature. The apparatus is easily sterilized between fillings and requires no complicated measures for charging it with carbon dioxide and a carbonated beverage.

The invention can be understood readily by reference to the accompanying drawing wherein, in the interest of clarity, certain features are shown on a somewhat exaggerated scale, and wherein:

FIGURE 1 is an elevation of a portable beverage dispenser embodying features of the invention;

FIGURE 3 is a partial sectional elevation taken along the line III—III of FIGURE 2;

FIGURE 4 is a partial sectional elevation similar to that of FIGURE 2, but showing an alternative arrangement of the parts;

FIGURE 5 is a partial sectional elevation showing still another alternative arrangement of the parts; and FIGURE 6 is a partial sectional elevation showing yet another alternative arrangement of the parts.

Figure 2:
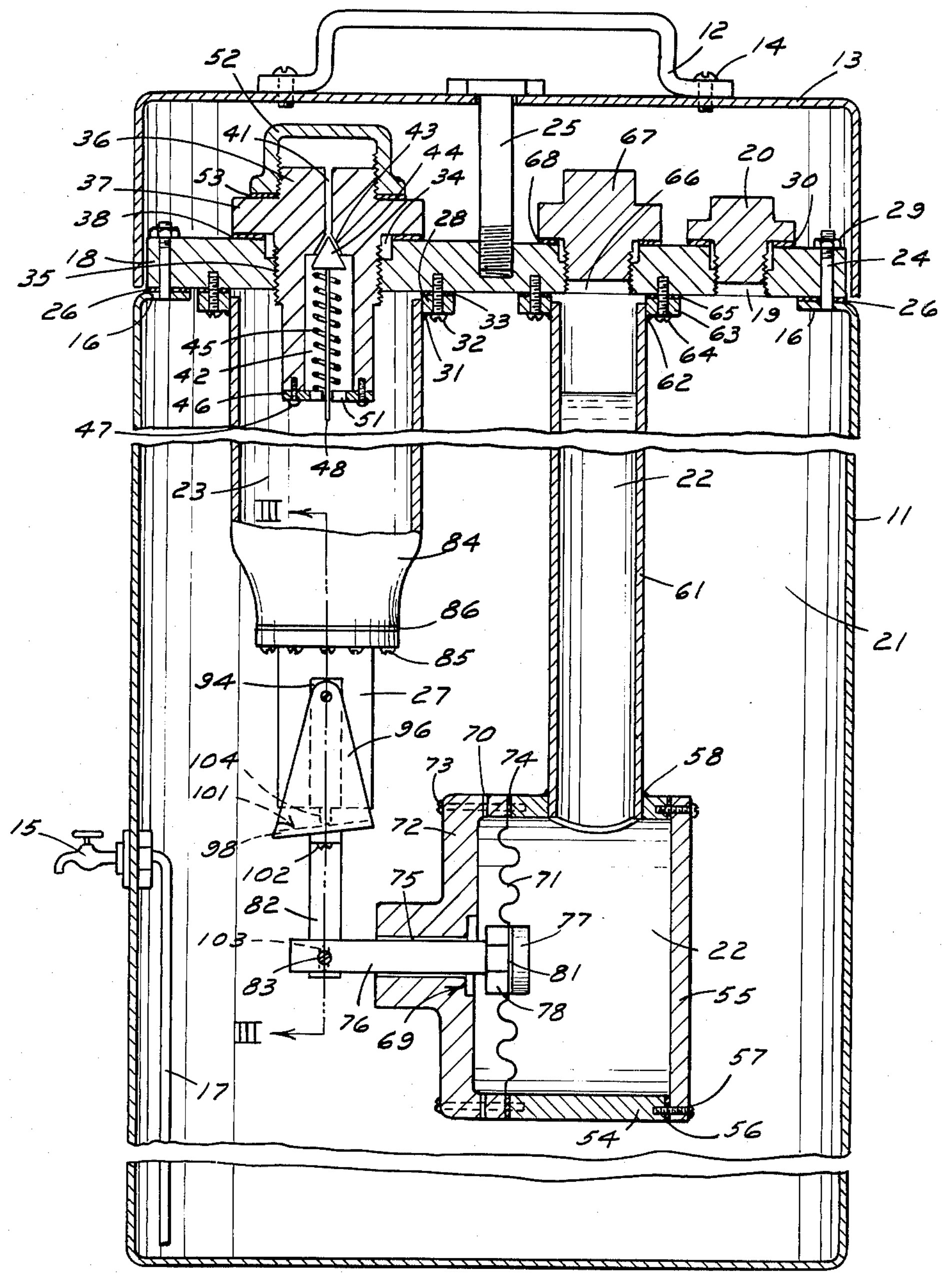
FIGURE 2 is an elevation, principally in section and considerably enlarged, of a dispenser similar to that of FIGURE 1.

Referring to FIGURE 1, there is shown in elevation one convenient form of one modification of a portable beverage dispenser of the invention comprising a container 11, a cover 13, a suitable cover bolt or screw 25 to retain the cover in place and a handle 12 secured to the cover by suitable screws 14. With the cover 13 secured in place, the entire dispenser can be carried from place to place readily by means of the handle 12. There is also illustrated in FIGURE 1 a dispensing valve or spigot 15 which will be referred to later and through which carbonated beverage can be withdrawn or dispensed from the dispenser as desired. It is noted that in the modification illustrated in FIGURE 1 the entire dispenser is in elongated, cylindrical form adapted to stand on its end when in use but it should also be noted that the shape dimensional proportions and other design features intended to enhance the appearance of the apparatus are merely matters of choice and are not pertinent insofar as the invention is concerned. Thus, the dispenser of this invention can have essentially the external appearance of the apparatus described in the parent application with equal facility.

Referring to FIGURE 2, it will be noted that the interior of the container 11 comprises three chambers, i.e. a beverage chamber 21, a regulating or diaphragm chamber 22 and a gas chamber 23. The container 11 is open at the top and has its upper lip turned inwardly to form a circular horizontal flange 16 to which a suitably heavy filler plate 18 is secured in gas-tight relationship, as by studs 24 welded to the flange 16 and nuts 29. A suitable gasket 26 can be interposed between the flange 16 and the filler plate 18 if desirable or necessary. The cover 13, referred to previously, fits snugly around the circumference of the plate 18 with its lower end abutting the flange 16 and, when seated and secured by the cover screw 25, is retained firmly in place and serves to protect the plate 18 and parts associated therewith, which will be referred to later.

The spigot 15 connects through the wall of the container 11 in any suitable leakproof fashion with a downpipe 17 which extends to a position closely adjacent to the bottom of the container. Because of the super-atmospheric pressure in the beverage chamber 21, the spigot 15 furnishes a ready means for dispensing substantially all of the carbonated beverage from the beverage chamber 21, even though it be located near the top of the side wall of the container. Alternatively, of course, the entire dispenser can be mounted on a stand and a suitable modification of the spigot 15 can be mounted directly in the bottom wall of the container.

The gas chamber 23 is adapted to contain any suitable gas, preferably carbon dioxide, under a suitable pressure. The gas chamber 23 is conveniently cylindrical in shape and fitted at the bottom with a normally closed valve located in a valve seat member 27 which will be referred to in more detail later. The gas chamber 23 is conveniently secured to the under side of the filler plate 18 so that it projects downwardly into the beverage chamber 21. One convenient manner of accomplishing this is to secure a suitably heavy circular mounting ring 28 around its open upper end, as by welding at 31, and to then secure the mounting ring to the inner surface of the plate 18, as by screws 32 and a suitable gasket 33. Access to the gas chamber 23 is by way of a suitable gas filler port 34, the lower section of which is threaded as at 35 to receive a suitable externally threaded gas filler port plug 36. The plug 36 is provided with an encircling flange 37 larger than the upper end of the port 34 which, when the plug is drawn down tightly, effectively seals the port against leakage of gas from the chamber 23. Generally a suitable gasket 38 is employed between the flange 37 and the surface of the plate 18, although a ground metal-to-metal joint can be employed if desired.

The gas filler port plug 36 is provided with any suitable valve means by way of which carbon dioxide or other suitable gas can be introduced into the gas chamber 23 until the pressure therein attains a value which indicates that the correct amount of gas has been added. In the arrangement shown for introducing gas into the chamber 23 by way of the plug 36, the plug is bored longitudinally, the upper section 41 of the bore being relatively small and the lower section 42 of the bore being relatively large. The wall of the bore between the upper and lower sections is sloped upwardly and inwardly to provide a valve seat 43 upon which a valve 44 can seat in gas-tight relationship. The relatively large lower section 42 of the bore in the plug 36 serves as a spring chamber in which is located a suitable compression spring 45 which urges the valve 44 gently against the valve seat 43. The spring 45 is retained in its chamber by a spring-retaining plate 46 which is secured across the lower end of the spring chamber 42, as by screws 47. The valve 44 is fitted with an elongated downwardly projecting valve stem 48 which projects through a central hole in the plate 46, thus assuring proper alignment of the valve 44 at all times. The plate 46 is provided with one or more suitable ports 51 through which gas can pass from the chamber 42 into the gas chamber 23. The upper end of the filler port plug 36 is prolonged above the flange 37 and is threaded externally to accommodate a suitable cap 52 which, when screwed down firmly on a suitable gasket 53, effectively prevents the escape of gas from the gas chamber 23 should there be a leakage of gas past the valve 44.

The gas chamber 23 is conveniently charged with gas by removing the cap 52 and attaching in its place the internally threaded end of a suitable gas supply line, e.g. of a conventional hose or pipe communicating by way of a suitable reducing valve with a cylinder or tank of compressed carbon dioxide. By installing a pressure gauge in the gas feed line and by utilizing a spring 45 under sufficiently light tension, the pressure of gas built up in the chamber 23 can be read directly from the pressure gauge within the limits of significant accuracy. When the proper amount of gas has been introduced into the chamber 23, the gas feed line is removed from the plug 36 and the cap 52 replaced. Generally, as will be noted, the gas chamber 23 will be charged to a pressure of 200–600 lbs. per sq. in., although the precise pressure will depend upon a number of factors.

One modification of an arrangement for admitting carbon dioxide gas from the gas chamber 23 into the beverage chamber 21 is illustrated in FIGURE 3. In this modification a section 84 of the wall of the gas chamber 23 is thickened and depressed flat to furnish a seat for the valve seat member 27 referred to previously. The end of the member 27 is secured to the thickened section 84 as by screws 85 to provide a tight seal between them, a suitable gasket 86 being employed if necessary. A gas escape port 87 through the wall section 84 communicates with an elongated ball chamber 88 in the member 27 in which is located a ball 91 which is tensioned lightly on a seat 92 by a compression spring 93 located between the ball and the wall section 84.

The valve seat member 27 is milled to form flat surfaces 94 on opposite sides thereof which extend in planes essentially parallel with the longitudinal axis of a diaphragm rod 76 which will be referred to later. A U-shaped swivel member, indicated generally at 95, is provided with parallel arms 96 separated from one another by a distance slightly greater than the distance between the two flat surfaces 94. The upper ends of the arms 96 are secured so as to swivel on swivel pins 97 inserted in the member 27 near the upper ends of the flat surfaces 94. The bottom cross member 98 of the U-shaped member connecting the arms 96 at their lower ends is formed with a sloping upper surface 101, shown more clearly in FIGURE 2, facing the lower end of the valve seat member 27, the arms 96 of the U-shaped member being long enough to allow the connecting cross member 98 to clear the lower end of the valve seat member 27 when the member 95 swivels or swings on the pins 97. The upper surface of the cross member 98 slopes downwardly at a suitable angle away from a diaphragm chamber 22, which will also be referred to later, as shown clearly in FIGURE 2.

A suitable actuator arm 82 is secured as by screws 102 rigidy to the lower surface of the cross member 98 and extends downwardly so as to intersect and extend somewhat beyond the longitudinal axis of the diaphragm rod 76 referred to, the end of the latter being slotted to receive the lower end of the actuator rod. A pin 83, suitably a small bolt, passes through the split section of the diaphragm rod and through a suitable longitudinal slot 103 in the arm 82 securing them together so that the actuator rod 82 can swing with the pin 83 without binding as the diaphragm rod 76 moves longitudinally. The slot 103 should be of a width sufficient to just accommodate the pin 83 snugly but should be sufficiently long to accommodate the necessary travel of the pin longitudinally of the slot.

A suitable valve pin 104 is located in a pin bore 109 extending longitudinally of the member 27 downwardly from the center of the ball seat 92 to the lower end of the member 27. The diameter of the bore 109 is, of course, less than the diameter of the ball chamber 88 to insure the ball 91 being retained in its chamber. The diameter of the valve pin 104 is slightly less than the diameter of the bore 109 to allow for the passage of released carbon dioxide downward through the bore alongside the pin 104. Preferably, although not shown in the drawing, the valve pin 104 fits the pin bore 109 snugly to avoid side play of the pin and is fluted longitudinally to provide suitable passageways for released carbon dioxide. The valve pin 104 is preferably rounded at its ends. The lower end of the pin 104 rides on the sloping surface 101 and is of a length such that with the diaphragm rod 76 in its "normal" or nonextended position, as will be explained, the upper end of the pin just clears the ball 91. With the apparatus adjusted in this condition, a minimum amount of travel of the diaphragm rod 76 outwardly of the diaphragm chamber 22 will cause the sloping surface 101 of the cross member 98 to engage the lower end of the pin 104 slidably and lift it slightly, thus unseating the ball 91 slightly and allowing carbon dioxide to bleed past it into the beverage chamber 21.

As has been noted previously, one modification of the invention contemplates utilization of the change in pressure exerted by a carbonated liquid in a regulating chamber to regulate in temperature-compensating fashion the release of gas, e.g. carbon dioxide gas, from the chamber 23 of FIGURE 2, into the beverage chamber 21 as beverage is dispensed from the latter chamber to maintain the degree of carbonation of the undispensed beverage at all times at the correct value. The carbonated liquid, conveniently referred to generally as a "regulating liquid," is contained in a chamber which can be referred to generally as a "regulating chamber." In the modifications illustrated in detail a wall of the regulating chamber is fitted with a suitable flexible diaphragm in such a way that the diaphragm is subjected on one side to the pressure prevailing in the regulating chamber and on the other side to the pressure prevailing in the beverage chamber. When so constructed it is convenient to refer to the regulating chamber as a "diaphragm chamber," although it is to be understood that any suitable means other than a flexible diaphragm can be employed for sensing a pressure difference between the regulating chamber and the beverage chamber. Such means can, for example, comprise a pressure sensitive electric switch connected in series with a suitable electrically operated gas release valve, or any other suitable arrangement.

It has also been pointed out that the regulating liquid can consist of carbonated water or of a portion of the carbonated beverage itself or, in fact, of any other gas-charged liquid which exhibits approximately the same variation in the pressure generated by it with change in temperature as does the carbonated beverage in the beverage chamber. In the event the carbonated liquid employed is water or a gas-charged liquid other than the beverage itself, it will be appreciated that care should be exercised to see that it does not become mixed with the carbonated beverage. In fact, it is convenient to seal the regulating or diaphragm chamber containing the regulating liquid essentially permanently, or at least to the extent that the dispenser can be recharged with carbon dioxide and with carbonated beverage without removing or renewing the regulating liquid. In the modification illustrated in FIGURE 2 the diaphragm chamber is, as will be apparent, constructed with special reference to this latter modification wherein the regulating liquid remains in the diaphragm chamber through a number of fillings of the apparatus of the dispenser with carbonated beverage.

Referring further to FIGURE 2, it should be noted that the regulating or diaphragm chamber 22 can comprise any suitably shaped closed chamber in which the regulating liquid, e.g. carbonated water, can be confined and in which it will at all times be at essentially the same temperature as a carbonated beverage in the beverage chamber 21. In the modification of FIGURE 2 the diaphragm chamber comprises a cylindrical member 54 closed at one end with a plate 55 and a suitable gasket 56 by way of screws 57. The cylindrical member 54 communicates through its wall in gas- and liquid-tight fashion, as by welding at 58, with an elongated tubular member 61 to the opposite end of which is secured, as by welding at 62, an exterior ring 63. The ring 63 is secured, as by screw 64 and a suitable gasket 65, to the underside of the plate 18 around a diaphragm chamber port 66 in the plate. The port 66 is closed by a plug 67 and a suitable gasket 68.

The end of the cylindrical member 54 opposite the plate 55 is closed by a flexible diaphragm 71 which is retained in place by a diaphragm-retaining member 72 which is secured to the end of the cylindrical member 54 by suitable bolts or screws 73 so as to clamp the outer rim of the diaphragm between the members 54 and 72. A suitable gasket 74 between the rim of the diaphragm 71 and the end of the cylindrical member 54 insures a tight seal between them. The diaphragm-retaining member 72 is cap-shaped with a central bore 75 which serves as a raceway for retaining a diaphragm rod 76 slidably in axial alignment therein. One end of the diaphragm rod 76, i.e. its inner end, is formed with an encircling flange 77 which, when the rod 76 is inserted through a central hole in the diaphragm 71, bears against the flat central inner surface of the diaphragm 71. A diaphragm nut 78 engages a threaded section of the rod 76 adjacent to the flange 77 and when tightened down clamps the central section of the diaphragm tightly between the nut 78 and the flange 77. A suitable gasket 81 can be interposed between the diaphragm and the flange 77 to insure a tight seal if necessary. The opposite end of the diaphragm rod 76 is slotted, as mentioned previously, so as to straddle the valve-actuator arm 82 to which it is secured by way of the pin 83. The regulating liquid is sealed in the diaphragm chamber 22. It will thus be observed that at any particular temperature the regulating liquid in the diaphragm chamber 22 will exert a certain definite pressure on the diaphragm 71, the pressure depending upon the precise nature of the liquid. In the event this pressure is greater than the pressure exerted on the opposite side of the diaphragm by a carbonated beverage in the beverage chamber 21, the diaphragm will flex outwardly with respect to the diaphragm chamber 22, causing the diaphragm rod 76 to slide longitudinally in its raceway 75 and causing the valve-actuator arm 82 to swing away from the diaphragm chamber, unseating the ball 91 and releasing carbon dioxide from the gas chamber 23 until the pressure in the beverage chamber 21 is again equal to the pressure in the diaphragm chamber 22 and the diaphragm 71, diaphragm rod 76 and valve-actuator arm 82 have returned to their original positions with the diaphragm unflexed, thus arresting the flow of carbon dioxide from the gas chamber 23. By this means, the pressure in the beverage chamber 21 is maintained essentially constant during the dispensing of the entire amount of beverage therefrom and the degree of carbonation of the beverage does not vary appreciably at any time during the dispensing operation.

It will be remarked that the pressures inside both the diaphragm chamber 22 and the beverage chamber 21 will vary appreciably with the temperatures of the respective chambers. However, by choosing an appropriate regulating liquid, the rates of change of pressure in the chambers 21 and 22 with respect to temperature are essentially the same and the degree of carbonation of the beverage in the chamber 21 will be maintained essentially constant regardless of the temperature of the chamber 21 and the proportion of the beverage which has been dispensed from it. In the event the temperature of the beverage in the beverage chamber 21 is likely to vary considerably from time to time, e.g. during transportation when the filled container is subjected to conditions of varying temperature, it is, of course, essential for best operation of the apparatus that temperature equilibrium between the chambers 21 and 22 be maintained as closely as possible at all times. For this reason it is desirable, although not in all cases essential, that the diaphragm chamber 22 be immersed, in, or in other good heat exchange relationship with, the contents of the beverage chamber 21.

It will be noted also that as carbon dioxide is released from the gas chamber 23 the pressure therein will decrease but that this is of no importance since the release of carbon dioxide is independent of the pressure in the chamber 23 except in a very minor way as a high pressure therein may require a little more force to be exerted on the arm 82 to open the carbon dioxide release valve. However, with suitable leverage characteristics the apparatus will function smoothly and accurately even though the chamber 23 be built strong and charged with liquid carbon dioxide. Preferably, however, the chamber 23 is, as noted previously, not under such high pressures.

A number of holes 70 are drilled around the circumference of the diaphragm-retaining member 72 to permit the free flow of liquid into, and drainage of liquid from, the space between the member 72 and the diaphragm 71. This insures equalization of the pressure in the space with that in the beverage chamber 21 rapidly at all times and also permits drainage of all liquids from the space during washing and sterilization of the apparatus. It may also be desirable to provide for limiting the degree of flexing of the diaphragm 71 outwardly of the diaphragm chamber 22 to avoid deforming it permanently, e.g. when sterilizing the apparatus or when the beverage chamber becomes empty and the pressure therein drops to atmospheric pressure. This can be accomplished in any desired manner. One way shown in FIGURE 2 is the provision of a properly spaced surface 69, e.g. a shoulder or the bottom of a suitable depression in the member 72 immediately around the diaphragm rod 76 at a suitable distance from the nut 78 when the diaphragm is in its unflexed condition. Flexing of the diaphragm is thus arrested when it has flexed sufficiently to cause the nut 78 to contact the arresting surface 69.

Referring again to FIGURE 2, it will be noted that the filler plate 18 is also provided with a filler port 19 which can be closed by a suitable filler port plug 20 and gasket 30. In filling a carbonated beverage into a container it is often the practice to introduce the beverage into the container into which it is being transferred by means of a delivery pipe which extends essentially to the bottom of the container receiving the liquid. In this way the end of the delivery pipe soon becomes covered with the introduced beverage and the tendency for the beverage to foam due to vaporization of some of the dissolved carbon dioxide is reduced greatly, the loss of carbon dioxide being reduced accordingly. For this reason it may be desirable, although not always necessary, to locate the filler port 19 in the plate 18 at a position such that a delivery tube can be inserted through it clear to the bottom of the beverage chamber 21 without striking any part of the diaphragm chamber 22 or the gas chamber 23. Alternatively, a flexible delivery pipe can be employed for introducing the beverage into the chamber 21, if desired.

The modification of the dispenser illustrated in FIGURE 2 can be washed and sterilized readily by first removing the cover bolt 25, the cover 13 and the filler plug 20 and then inverting the apparatus. Wash water and steam can then be blown upward into the container through the filler port 19 by means of a suitable steam pipe which is small enough to permit draining of condensate outward through the filler port around it. By opening the dispensing valve 15, steam will also be blown through the pipe 17 and the valve, sterilizing them as well. In the event it is desired to sterilize the inside of the gas chamber 23, this can be accomplished readily by first removing the gas filler port plug 36, whereupon steam will bleed bcakward through the valve seat member 27 and out through the gas filler port 34. During this operation the pressure inside the still closed diaphragm chamber 22 will rise considerably, but this can be minimized by leaving a relatively large proportion, e.g. from 15 to 20 percent, of its volume unfilled with regulating fluid. In any event, the contacting of the nut 78 with the surface 69 will prevent undue straining of the diaphragm and will insure that the ball 91 remains unseated during the sterilizing operation.

After the apparatus has been thoroughly sterilized, it is drained carefully and the gas filler port plug inserted tightly. The dispening valve 15 is closed and the entire apparatus is allowed to cool, preferably being chilled to the temperature at which the subsequent filling operation is intended to be carried out. When the apparatus, including the regulating liquid in the diaphragm chamber 22, has cooled to the filling temperature, the pressure inside the diaphragm chamber 22 will be at approximately atmospheric pressure, or even slightly below, and the pressure on the opposite sides of the diaphragm will, therefore, be essentially the same and the ball 91 will be seated. The beverage can then be introduced into the beverage chamber 21 and the filler plug 20 seated tightly, after which the requisite amount of carbon dioxide is introduced into the gas chamber 23 in the way which has been described and the safety cap 52 is then tightened down. The cover 13 and cover bolt 25 are then attached and the charged apparatus is ready for distribution to the consumer.

As has been mentioned previously, one regulating fluid which can be placed in the regulating chamber and which will function very satisfactorily is a portion of the carbonated beverage itself. A portion of the carbonated beverage may even be employed when, as mentioned in the description of FIGURE 2, the regulating fluid is left in the regulating chamber from one filling of the beverage chamber to the next, provided the stability characteristics of the carbonated beverage preclude the changing of the pressure which it exerts at a given temperature after long continued use. On the other hand, the use of either a portion of the carbonated beverage or of carbonated water or of any other regulating liquid which is retained in the regulating chamber from one filling of the dispenser to the next decreases the useful capacity of the apparatus for a carbonated beverage in an amount equal to the volume of the regulating chamber. This is, of course, somewhat undesirable since it requires more frequent return of the dispenser for refilling.

In the modification of FIGURE 4 there is illustrated a dispenser somewhat similar to that of FIGURE 2 but constructed not only so that a portion of the carbonated beverage itself serves as the regulating fluid but also so that this portion is available for dispensing in the regular manner along with the last portion of the carbonated beverage dispensed from the beverage chamber itself. It will be appreciated that, for most accurate control of the degree of carbonation of the beverage in the beverage chamber, the change in pressure with respect to temperature of the regulating liquid in the regulating chamber should be as nearly as possible the same as that of the beverage being dispensed from the beverage chamber 21. This condition is met precisely by utilizing a portion of the carbonated beverage itself as the regulating liquid in the regulating chamber. Certain other advantages of the modification of FIGURE 4 will also be apparent as the description proceeds.

In the modification illustrated in FIGURE 4 the gas chamber and the diaphragm, as well as the parts associated immediately therewith, are essentially the same as those of FIGURES 2 and 3, and these parts will not be described again in detail. However, the diaphragm chamber 22 of FIGURE 4 and certain of its associated parts are constructed somewhat differently from those of FIGURE 2 and these parts will be described in detail. The diaphragm chamber 22 is in this instance enclosed by a suitable elongated, conveniently tubular, member 105 closed at one end by an upper end plate 106 and at the other end by a lower end plate 107, suitable gaskets 108 and 111 being interposed between the ends of the member 105 and the respective end plates to insure a tight seal in each instance. The upper end plate 106 is spaced from the filler plate 18 as by a spacer ring 112 and suitable bolts 113 extend through the filler plate 18, longitudinally through the wall of the spacer ring 112, through the upper end plate 106 and gasket 108 into the wall of the tubular member 105. Tightening of the bolts 113 secures these several elements securely in place with respect to one another. Drain ports 114 are provided in the spacer ring 112 to furnish communication between the beverage chamber 21 and the space encircled by the ring. A suitable filler port 115 extends through the filler plate 18 coaxial with the upper and lower end plates 106 and 107 and is closed when desired by a filler port slug 116 and a suitable gasket 117, the plug engaging the internally threaded port 115 in conventional fashion. The lower end plate 107 can be secured to the lower end of the tubular member 105 in any suitable manner, as by screws 118. A suitable tubular member 121 is let into one side of the diaphragm chamber wall and secured, as by welding at 122. The outer end of the tubular member 121 is cut in a single plane against which the diaphragm 71 with a suitable interposed gasket 74 is secured in a manner substantially identical with that described in connection with FIGURE 2.

The upper and lower end plates 106 and 107 are bored axially to provide an upper valve port 123 and a lower valve port 124, respectively. An upper valve stem 125 having a diameter somewhat less than the upper valve port 123 extends downwardly through the port and is provided somewhat removed from its upper end with an encircling upper valve flange 126 faced on its lower surface with a suitable upper valve 131, the flange and facing resting on the upper surface of the upper end plate 106 around the port 123 and, when pressed downwardly thereon, effectively sealing the port. The diameters of the flange 126 and the facing 131 are less than the diameter of the filler port 115. The upper section of the valve stem 125 above the region of the flange 126 projects into a suitable recess 132 extending axially part way through the plug 116, the recess being of only slightly greater diameter than the section of the valve stem which it encompasses, thus insuring centering of the valve stem and the valve sufficiently accurately with respect to the upper valve port 123. The extreme upper end of the valve stem 125 is bored longitudinally downward to provide a spring cavity 133 in which is located a compression spring 134 which, with the parts assembled, bears at its upper end against the end wall of the nut recess 132 and at its lower end against the bottom of the spring cavity 133, thus maintaining compressive contact of the valve facing 131 with the upper surface of the upper end of plate 106 around the upper valve port 123

A lower valve stem 135 is also provided having a diameter less than the diameter of the upper valve stem 125. The lower end of the valve stem 135 is provided with an encircling flange which serves as a lower valve plate 136. The plate 136 is faced on its lower surface with a lower valve facing 137 which seats on the upper surface of the lower end plate 107 encircling the lower valve port 124, the diameters of the plate 136 and facing 137 being greater than the diameter of the port 124. The lower end of the valve stem 135 which projects through the valve facing 137 is threaded to receive an elongated nut or cap 142 with a flat upper end which, when screwed down tightly, retains the facing 137 securely in place. The cap 142 is elongated so that it projects below the lower surface of the lower end plate 107 and is preferably rounded on its lower end. The cap 142 has a diameter of just slightly less than the diameter of the valve bore 124 so that it slides freely therein but also so that it serves to center the valve plate and valve facing 136 and 137 with respect to the valve bore 124. The cap 142 is preferably provided with longitudinal grooves or flutes 144, through which liquid can flow through the port 124 when the lower valve is unseated.

The lower section of the upper valve stem 125 is drilled longitudinally to furnish an elongated spring cavity 145 which has a diameter slightly larger than the diameter of the lower valve stem 135 so as to accommodate the upper section of the latter without too tight a fit. A suitable compression spring 146 is located in the spring cavity 145 which bears at its upper end on the end wall of the spring cavity 145 and at its lower end on the end of the lower valve stem 135. With the upper valve held in place by the upper compression spring 134 as described previously, and with the lower compression spring 146 and upper end of the lower valve stem in the cavity 145 as illustrated and desscribed, the lower valve facing 137 will be pressed into firm contact with the lower end plate 107 to furnish a tight seal. It is clear that the tension exerted by the spring 146 should be less than that exerted by the spring 134 to avoid any possibility of the tension of the lower spring 146 lifting the upper valve stem 125 and causing the upper valve facing 131 to be lifted out of contact with the surface of the upper end plate 106. With this condition prevailing and with the filler port plug 116 seated firmly, both the upper and lower valves will also be seated firmly and any portion of beverage which is enclosed in the diaphragm chamber 22 will be retained therein without any leakage in either direction between the regulating chamber 22 and the beverage chamber 21, even though the pressure in the latter should fall to several pounds per square inch below the pressure in the diaphragm chamber 22. As will be apparent from a study of the functioning of the entire apparatus, this condition will not occur during normal usage of the apparatus.

A transverse pin 147 is driven tightly into a transverse bore in the upper section of the lower valve stem 135 which normally extends into the spring cavity 145. The pin 147 extends through suitable vertical slots 148 in opposite walls of the spring cavity 145, the slots being long enough to insure proper seating of both the upper and lower valves and to allow unseating of the lower valve without unseating of the upper valve in the way which will be described. It should be noted also that the diameter of the lower valve plate 136 as well as the diameter of the lower valve facing 137 is less than the diameter of the upper valve port 123. It is thus possible by removing the filler port plug 116 and by grasping the upper end of the upper valve stem 125, which preferably projects above the level of the upper surface of the filler plate 18, to lift the entire upper and lower valve stems and corresponding valve assemblages from the apparatus for cleaning and servicing as may be required or for filling the dispenser with a berverage introduced through the filler port 115. When the upper valve stem 125 is lifted through the filler port 115, the transverse pin 147 is engaged by the lower ends of the slots 148 and the lower valve and valve stem assemblage is removed through the upper valve port 123. The valves and valve stem assemblages may again be located properly in the apparatus by simply inserting the assembly through the port 115, being sure that the cap 142 enters the valve port 124 and then replacing the filler port plug 116 with the spring 134 in place and screwing the plug down tightly.

With the apparatus of FIGURE 4 as thus far described it will be clear that essentially all of the carbonated beverage can be dispensed from the beverage chamber 21 under conditions of an essentially constant degree of carbonation, regardless of any changes in temperature to which the dispenser and contents may have been subjected subsequent to filling and sealing. Means will now be described whereby the portion of the carbonated beverage enclosed as the regulating fluid inside the diaphragm chamber 22 can also be dispensed from the apparatus in usable form. To accomplish this a suitable float 151 is provided which is held near the bottom of the container 11 and is thus buoyed upward by the beverage in the beverage chamber 21 until all but a relatively small proportion of the beverage has been dispensed from the chamber. According to the arrangement illustrated in FIGURE 4 the float 151 is attached to a downwardly projecting float stem 152 of suitable length and diameter. The float stem 152 is hinged at its upper end, as by a hinge pin 158, to a suitable rocker arm 184 which projects approximately horizontally with its end opposite the hinge pin 158 being located immediately below but, during dispensing of the greater proportion of the beverage from the chamber 21, not in contact with the rounded lower end of the cap 142 which projects downwardly through the lower valve port 124. A suitable float supporting bracket 153 is secured to the lower surface of the lower end plate 107 as by screws 154, the bracket being provided with a pair of arms 155 which project downwardly on opposite sides of the rocker arm 184 intermediate its ends. A swivel pin 156 extending through the arms 155 and the rocker arms 184 provides means whereby the end of the rocker arm 184 opposite the hinge pin 158 will travel approximately upwardly or downwardly as the float 151 travels downwardly or upwardly, respectively, in response to the buoyancy exerted upon it by the beverage in the beverage chamber. The bracket 153 can be prolonged downwardly in any suitable way and provided with additional arms 157 and guides 159 of any suitable character to control the direction and limit the extent of the travel of the float 151 and also to retain it in a steady position during transportation of the apparatus.

With the float 151 and associated elements installed and located as described, the float 151 will rest at the upper limit of its travel in the filled dispenser and until sufficient beverage has been dispensed from the chamber to cause the float to travel downwardly when further beverage is dispensed. By forming and arranging the parts suitably this may occur when as little as 5 to 10 per cent, or even less, of the beverage originally in the beverage chamber remains therein. Dispensing of further amounts of the beverage causes the float 151 to travel downwardly and the nut 142, together with the lower valve plate 136, valve facing 137 and the lower valve stem 135, to be forced upwardly against the tension of the compression spring 146. The lower valve of the diaphragm chamber 22 is thus opened and the portion of the beverage contained in the diaphragm chamber 22 can flow outwardly through the lower valve port 124 into the beverage chamber 21 from which it can be dispensed in the regular manner. The dead weight of the float and the leverage exerted on the nut 142 should, of course, be sufficient to compress the spring 146 and open the lower valve. It will be noted that, once the lower valve of the diaphragm chamber 22 is opened in the way just described, the pressures in the diaphragm chamber and the beverage chamber will be equalized immediately and the diaphragm 71 will assume its "normal" position, thus closing the carbon dioxide release valve and preventing any further carbon dioxide from being supplied to the beverage chamber 21. However, since this equalization of pressure occurs only after the beverage chamber has been emptied almost completely and since the amount of beverage enclosed in the diaphragm chamber 22 is not normally more than a relatively small proportion of the total beverage involved, the entire remaining beverage, i.e. that remaining in the beverage chamber and that flowing therein from the diaphragm chamber, can be dispensed without any appreciable or undesirable decrease in the pressure prevailing in the beverage chamber and, therefore, without noticeable lowering of the degree of carbonation of even the last remaining traces of the beverage.

When it is desired to sterilize and fill the modification of FIGURE 4, the spigot 15 is opened, the filler port plug 116 is removed and the valve assemblage withdrawn in the way noted previously. By then inverting the apparatus and introducing cleaning fluid and steam through a steam hose upwardly into the apparatus through the filler port 115, adequate cleaning and sterilization of the entire apparatus can be effected. The apparatus is then drained carefully and set upright and preferably allowed to cool or chill. The spigot 15 is then closed and the carbonated beverage at the requisite low temperature, e.g. at about 32° F., is then poured into the container through the port 115 until it has been filled sufficiently. Alternatively, a separate port and plug can be provided similar to that illustrated in FIGURE 2, if desired, to allow the beverage to be delivered at the bottom of the container 11 if foaming is a problem during pouring. Sufficient vapor space should be left in the container to avoid the build-up of undue pressures due to hydrostatic pressure, but this need not comprise more than 10 percent, or even less, of the volume of the beverage chamber. The valve assemblage is then reinserted and the plug 116 seated, after which the carbon dioxide chamber is charged with carbon dioxide to the desired pressure and the apparatus is ready for delivery to the customer. If desired, the carbon dioxide can be introduced into the gas chamber before the carbonated beverage is introduced into the beverage chamber. It will be noted that by introducing the beverage into the dispenser with the valve assemblage removed the level of beverage in the diaphragm chamber 22 will be the same as that in the beverage chamber 21. Since it is usually desirable that the diaphragm chamber 22 contain at least a small volume of vapor space to overcome any effect of the development of hydrostatic pressure, it is generally desirable that the distance between the filler plate 18 and the upper end plate 106 be relatively short.

As mentioned previously, many carbonated beverages are carbonated to such a degree that they can be transferred from one vessel to another at atmospheric pressure without excessive foaming or loss of dissolved carbon dioxide provided the temperature is kept only slightly above the freezing temperature. In some instances, however, it may be desirable to introduce a carbonated beverage into the dispenser of the invention at a temperature considerably above the freezing temperature under conditions such that it is necessary to maintain the pressure on the beverage during the transfer operation well above atmospheric pressure. It may also sometimes be desirable to load the dispenser with a beverage which is so highly carbonated that it must be handled under superatmospheric pressure even at a temperature only slightly above its freezing temperature. Filling of the dispenser of the invention while maintaining the beverage under superatmospheric pressure can be accomplished readily employing the modification illustrated in FIGURE 5.

In FIGURE 5, wherein certain of the parts and elements similar to those of FIGURES 2 or 4 are not shown, a diaphragm chamber comprises an elongated tubular member having upper and lower end plates, 106 and 107, respectively, as described previously. In this instance the diaphragm chamber is supported at a suitable distance beneath the filler plate 18, e.g. by a plurality of rigid hangers 162, each secured at one end to the lower surface of the plate 18, as by screws 163, and its other end suitably to the upper end plate 106, as by screws 164. In any event, the diaphragm chamber should be supported rigidly with respect to the filler plate 18, although any suitable supporting means to accomplish this can be employed.

The upper end plate 106 is provided with an upper axial valve port 123 and the lower end plate is provided with an axial lower valve port 124, suitable valves being provided to close each of these ports from inside the diaphragm chamber. To this end an upper valve stem 165 of suitable diameter and length is provided at its upper end with an upper valve flange 166 which has a flat upper surface and is adapted to press a suitable valve facing 167, with which its upper surface is covered, into contact with the lower surface of the upper end plate 106 around the valve port 123 to effectively seal the port. The extreme upper section of the valve stem 165 is of reduced diameter and is threaded externally to receive a suitable nut 168 which retains the valve facing 167 in place. The protruding end surface of the threaded section of the valve stem of reduced diameter is cut off square and preferably smoothed for reasons which will be apparent later. The upper valve just described is guided in its travel upwardly and downwardly to keep it essentially centered with respect to the valve port 123 in any convenient way, suitably by a cylindrical upper valve guide 171 having an encircling flange 172 at its upper end which is secured to the lower surface of the upper end plate 106, as by screws 173. The downwardly projecting wall of the guide is provided with suitable ports 174 to insure free passage of liquid or gas between the space encircled by the guide and the rest of the diaphragm chamber 22.

The lower end of the upper valve stem is bored axially to provide a spring cavity 145 in which is located a suitable ocmpression spring 146 which bears at one end against the end of the cavity and at its other end against the end of a lower valve stem 175 inserted upwardly into the cavity. The lower valve stem is provided near its lower end with an encircling lower valve flange 176 which is faced on its lower surface with a valve facing 177, the flange being adapted to press the facing 177 in response to the urging of the spring 146 into contact with the upper surface of the lower end plate 107 around the valve port 124 to seal the port effectively. A lower valve guide 178, similar to the upper valve guide 171, having suitable ports 181 in its wall, is secured, as by screws 182, to the upper surface of the lower end plate 107 to retain the lower valve assemblage approximately centered with respect to the port 124 during its travel upwardly and downwardly. The extreme lower end of the lower valve stem 175 is threaded externally to receive a nut or cap 183 which assists in retaining the valve facing 177 in place and which projects through the port 124 below the level of the lower surface of the lower end plate 107. The lower end of the cap 183 is preferably rounded and is adapted to be engaged by a rocker arm 184 in a manner entirely similar to the engagement of the nut 142 of FIGURE 4 by the rocker arm 184. It will thus be seen that under normal conditions the spring 146 will urge the upper and lower valve stems away from one another forcing the respective valves into positions such that both the valve port 123 and the valve port 124 are closed and the flow of liquid or gas between the diaphragm chamber 22 and the beverage chamber 21 surrounding it is effectively prevented. It is, of course, apparent from FIGURE 5 that the upper valve is held in the open position by the member 191, which will be referred to later, it being only necessary to mention here that this member 191 occupies the position shown only during the filling of the apparatus of the dispenser and that during the dispensing of beverage from the dispenser the member 191 is drawn upward sufficiently far to clear the upper end of the upper valve stem 165 completely.

As was explained in connection with the modification of FIGURE 4, the rocker arm 184 will swivel upwardly and open the lower valve against the compression of the spring 146 when the beverage chamber is essentially empty and the float therein, not shown in FIGURE 5, causes the rocker arm 184 to swivel on the swivel pin 156. When this occurs the portion of beverage contained in the diaphragm chamber is free to flow into the beverage chamber and is then available for dispensing.

To provide for filling the apparatus of FIGURE 5 with a carbonated beverage under more than atmospheric pressure, certain modifications of the filler port plug are employed and these will now be descibed. To this extent the filler plate 18 is, as before, provided with a suitable filler port 185 coaxial with the ports 123 and 124 which is threaded internally to receive a filler port plug 186, the plug being provided with an encircling flange 187 which, in cooperation with a suitable gasket 188, effectively seals the port 185, except for an axial bore in the plug, when the plug is screwed down tightly. The plug 186 is bored axially to provide a central bore 192 of suitable diameter which is coaxial with the bore 185. Valve means provided for closing the central bore 192 comprises a filler valve stem 191 having an encircling filler valve flange 193 with a valve facing 194 on its upper surface. The extreme upper end of the valve stem 191 is threaded externally to receive a nut 195 which assists in retaining the valve facing 194 in place. The flange 193 and the valve facing 194 have a diameter sufficiently large to bear against the lower surface of the plug 186 and effectively seal the central bore 192 against leakage of gas or liquid outwardly through the central bore. The valve stem 191 is retained in a position in which it is centered with respect to the central bore 192 but so that it can travel upwardly and downwardly slidably in a tubular valve stem guide 196 which is mounted rigidly with its longitudinal axis concentric with that of the central bore 192. The valve guide 196 can, if desired, be equipped with suitable legs or formed integral with the bottom of a cup-shaped member 197, the legs or cup-shaped member being in turn secured, as with screws 198, to the lower surface of the plug 186. Alternatively, and sometimes preferably, the valve stem guide 196 can be mounted on the upper surface of the upper end plate 106, if desired. Suitable means, such as a plurality of ports 200 and 201, are provided when the member 197 is cup-shaped to insure free flow of liquid and gas between the beverage chamber and the interior of the cup-shaped member. A suitable compression spring is provided encircling the valve stem 191 between the flange 193 and the guide 196 to urge the valve facing 194 upwardly into contact with the area of the lower surface of the plug 186 lying immediately around the central bore 192 to effectively seal the bore. It will be appreciated as the description proceeds that, except when the dispenser of FIGURE 5 is being filled, the tubular member 202 is withdrawn upward completely from the apparatus and offers no hindrance to the sealing of the flange 193 and facing 194 on the lower surface of the plug 186 around the central bore 192.

The central bore 192 in the plug 186 is enlarged at its upper end to provide an enlarged upper bore 203 which is threaded internally. When the dispenser is being used for dispensing purposes a suitable solid plug, not shown in FIGURE 5, is screwed into the enlarged bore 203 which, together with a suitable gasket 204, effectively seals the bore against any possibility of leakage should leakage past the valve plate 193 occur inadvertently. To fill the apparatus a suitable fitting, such as that shown in FIGURE 5, is provided and threaded into the enlarged upper bore 203. The fitting illustrated comprises a suitable filler plug 205 adapted to engage the internal threads of the enlarged bore 203. The plug 205 is bored axially with the upper part of the bore accommodating a filler tube 202 snugly, a stuffing box 206 of conventional design being provided further at the extreme upper end of the plug 205 through which the filler tube 202 can slide longitudinally without danger of leakage around it. The filler tube 202 is fitted beyond the stuffing box 206 with a suitable filler valve 207 to control the flow of carbonated beverage through the tube. The wall of the filler tube 202 is notched at its lower end to provide openings 209 of suitable size through which carbonated beverage can flow smoothly with a minimum of agitation. The lower end of the tube between the notches 209 is adapted to contact the valve nut 195 and, when the tube is slid downwardly through the stuffing box 206, to compress the spring 199 and open the central bore 192. By moving the filler tube 202 further downward, the valve stem 191 engages the upper end of the upper valve stem 165 and depresses it and thus opens the port 123 enabling carbonated beverage flowing into the apparatus to flow through the port 123 and fill the diaphragm chamber at the same time the beverage chamber is being filled. Withdrawal of the filler tube 202 upwardly permits the respective valves to seat in response to the urging of the springs 199 and 146 and effectively closes the central bore 192 and the port 123 in the upper end plate 106.

It will be noted that the central bore 192 is somewhat greater in diameter than the external diameter of the filler tube 202 and that the lower part of the bore in the plug 205 is also enlarged accordingly. The enlarged section of the bore in the plug 205 connects by way of a lateral bore 208 with a suitable external pipe or conduit 211 adapted to convey carbon dioxide into or out of the apparatus. The conduit 211 is branched by way of a conventional pipe T 212 from which an exhaust conduit 213 and an inlet conduit 214 lead separately to suitable exhaust and inlet valves 215 and 216, respectively. A pressure gauge 217 is inserted in the piping system just described between the inlet valve 216 and the plug 205. A suitable pipe union 210 can be installed between the plug 205 and the T 212 as a matter of convenience, if desired.

The procedure for filling the apparatus with a carbonated beverage under pressure will be apparent from the following. With the plug 205 and associated pipe and fittings in position as shown in FIGURE 5, the conduit 214 is attached to a suitable supply of carbon dioxide under pressure and the conduit 202 is attached to a suitable source of the carbonated beverage which is to be introduced into the dispenser, the valves 216 and 207 being closed. The filler pipe 202 is then slid downwardly through the stuffing box 206 to open the ports 192 and 123 in the way described previously. It will be noted that at this point the port 124 will also be open, since the beverage chamber contains no beverage and the float operating the rocker arm 184 is in its depressed position. The dispensing spigot is then opened and carbon dioxide admitted to the apparatus by way of the valve 216 until the apparatus has been swept free of air and filled with carbon dioxide at atmospheric pressure. The dispensing spigot is then closed and the flow of carbon dioxide into the apparatus through the valve 216 continued until a desired pressure of carbon dioxide in the dispenser has been built up. This pressure will depend upon the pressure exerted by the carbonated beverage which is to be run into the dispenser at the temperature at which the filling operation is to be carried out, the pressure registered on the gauge 217 being kept at the same, or slightly higher, pressure as that exerted by the carbonated beverage. When this pressure has been attained the inlet valve 216 for carbon dioxide is closed. The beverage inlet valve 207 is then opened and the beverage caused to flow, preferably by pumping, through the filler pipe 202 and by way of the notches 209 and the parts 201 into the beverage chamber. Introduction of the beverage is continued until the desired amount has been introduced into the dispenser. During the introduction of the beverage into the dispenser the exhaust valve 215 is open slightly and carbon dioxide which is displaced from the dispenser by the incoming liquid is allowed to escape by way of the ports 200, the bore 192 and the pipe 211 through the conduit 213. The regulation of the valve 215 can be effected manually or, if desired, it can be carried out automatically by using a sensitive pressure regulating valve in place of the manually operated valve 215. By maintaining the pressure in the beverage chamber as nearly as possible at the pressure exerted by the beverage flowing into the chamber, the entire filling operation can be carried out with essentially no overcarbonation or undercarbonation, and essentially no foaming, of the beverage occurring. Relatively careful control of the pressure is advisable. Should the pressure in the chamber increase unduly, some of the carbon dioxide will dissolve in the beverage with the result that it may become slightly overcarbonated. If the pressure be decreased unduly, some of the carbon dioxide dissolved in the beverage may volatilize and escape and the degree of carbonation of the beverage may be decreased accordingly. In addition, the escape of dissolved carbon dioxide from some beverages may lead to excessive and undesired foaming, which should, of course, be avoided. A further reason for maintaining as little change as possible in the degree of carbonation of the beverage during the filling operation follows from the fact that during normal operation of the apparatus during subsequent dispensing of the beverage the same degree of carbonation would be maintained through the entire operation. If the beverage in the beverage chamber is originally either overcarbonated or undercarbonated, the entire charge of beverage will be dispensed at this same degree of over- or under-carbonation.

After the beverage has all been introduced, the valves 207 and 215 are closed and the filler pipe 202 withdrawn through the stuffing box 206 sufficiently to allow the ports 192 and 123 to be closed by their respective valves. The port 124 will have been closed as soon as enough beverage has been introduced into the beverage chamber to cause the float to rise so that the rocker arms 184 clears the cap 183. After the filler pipe has been withdrawn sufficiently, the cap 205 with its attached piping and valve assembly is removed and the plug 205 is replaced by the solid plug referred to previously. The carbon dioxide chamber is then charged with carbon dioxide to the requisite pressure as referred to previously in connection with the description of FIGURE 2, the cover is installed and the apparatus is then ready for delivery to the customer.

It will be noted that in the modification of FIGURE 5 should it be found necessary to service the upper and lower valves of the diaphragm chamber, e.g. to renew the valve facings, or should it be found necessary to remove these valves from time to time for cleaning or for other purposes, it is necessary to dismantle the entire apparatus, first by removing the filler plate 18 from the container and then by removing one of the end plates of the diaphragm chamber. Although it is not likely that such servicing or removal operations would be necessary with any degree of frequency, it may at times be advisable to construct the apparatus so as to facilitate dismantling of its working parts as easily as possible. Thus the modification of FIGURE 4 has been designed with this in mind in the case of dispensers which are intended to be filled while under atmospheric pressure. In FIGURE 6, which will now be described, there is illustrated a modification in which the valve assemblages can be withdrawn from the apparatus much after the manner of FIGURE 4 but which is also adapted to be filled with a beverage while under greater than atmospheric pressure in much the same manner as that described for filling the modification of FIGURE 5. Reference to FIGURE 6 will show that many of the parts illustrated are similar in form and function to the corresponding elements of FIGURE 5 and, to avoid repetition, these elements and their function will not again be described in detail. However, it is noted that the modification of FIGURE 6 is shown with the filler tube 202 of FIGURE 5 and the accompanying piping, valves and other elements pertaining to the filling operation removed, the enlarged upper bore 203 in the filler plug 186 being closed with a sealing plug 218 and the valve bores 192, 123 and 124 being closed by the respective valves, as is the case during the time beverage is being dispensed from the modification of either FIGURES 5 or 6. Additionally, the lower valve guide 178 of FIGURE 5 is dispensed with in the modification of FIGURE 6, the same effect as that provided by the guide being obtained by enlarging the upper end of the lower valve bore 124, as shown at 221, to accommodate the valve flange 176 and the valve facing 177 with sufficient looseness to provide for the flow of liquid beverage through the enlargement around them when the valve is unseated but with sufficient closeness of fit to keep the valve centered adequately with respect to the bore 124.

With these points in mind and referring further to FIGURE 6, it will be noted that the upper end plate 106 of the diaphragm chamber is provided with a central bore 222 which is somewhat larger than the actual upper valve bore 123. An annular member 223 is provided which fits the enlarged bore 222 fairly snugly and which is provided with an encircling flange 224 which, with the annular member 223 located in the bore 222, projects over the section of the surface of the upper end plate which encircles the bore 222 so as to seal the bore when the flange and end plate are pressed together, a suitable gasket 225 being interposed between them when necessary. The annular member 223 is prolonged upwardly, as at 227, above the flange 224 and is engaged at its upper end with an exterior encircling, internally threaded flange 226. A suitable compression spring 228 located inside the upward prolongation 227 of the annular member 223 bears at its upper end against the lower side of the valve stem guide 196 and at its lower end against the upper surface of a flange 231 which encircles the annular member 223 interiorly and which is conveniently located approximately opposite the exterior encircling flange 224. The pressure of the spring 228 forces the annular member 223 downward into the port 222 and seals the port effectively against the flow of gas or liquid in either direction through it. The interior flange 231 encircles the upper valve port 123 which is closed by the upper valve secured to the upper valve stem 165 in the manner described in connection with FIGURE 5.

Suitable means, such as an annular lifting member 232, provided at its upper end with an exterior encircling flange 233 and at its lower end with an interior encircling flange 234, is secured to the lower surface of the valve stem guide 196, as by screws 235. The annular lifting member 232 has an internal diameter somewhat greater than the external diameter of the encircling flange 226 which encircles the upward prolongation 227 of the annular member 223 so as to furnish no hindrance to the upward or downward travel of the flange 226. The diameter of the port defined by the interior encircling flange 234 is sufficiently great to insure no hindrance to the upward or downward travel of the upward prolongation 227 but is sufficiently small to prevent the encircling flange 226 from passing through it and to serve as a suitable centering guide for the annular member 223. A flat annular member 236 having a central port 237 smaller in diameter than the upper valve flange 166 is secured to the lower end of the annular member 223 as by screws 238. The annular member 223 is prolonged downwardly below the upper end plate sufficiently to provide for removal of the flat annular member 236 sufficiently far from the interior flange 231 to permit depression of the upper valve by the downward travel of the valve stem 191 to the desired extent as described in connection with FIGURE 5. The internal diameter of the lower part of the annular member 223 is somewhat greater than the diameter of the valve flange 166 and the valve facing 167 so as not to retard the upward and downward travel of the valve but is sufficiently small to serve as a suitable means for centering the upper valve during its travel. The lower part of the wall of the annular member 223 can be provided with suitable ports 241, if necessary or desirable, to enable liquid beverage entering the diaphragm chamber through the port 123 during the filling operation to flow without restriction into the diaphragm chamber from above the level of the depressed upper valve and to allow for counterflow upward of carbon dioxide displaced from the regulating chamber by the entering beverage.

From the foregoing it will be seen that to remove the entire valve assembly for inspection and servicing it is only necessary to unscrew the filler port plug 186 and to lift it bodily from the apparatus, provided certain relationships of the parts are maintained. Thus, the external diameter of the exterior flange 224 of the annular member 223 should be less than the interior diameter of the filler port 185 and the exterior diameter of the lower valve flange 136 and the lower valve facing 137 should be less than the interior diameter of the central bore 222 in the upper end plate 106. When these relationships are maintained and the filler port plug 186 is lifted from the apparatus, the interior flange 234 of the annular lifting member 232 engages the exterior flange 226 of the upward prolongation 227 of the annular member 223 and lifts the annular member out of the apparatus through the filler port 185. Similarly, the flat annular flange 236 engages the upper valve flange 166 and lifts the upper valve stem assemblage, including the upper valve stem 165, with it. At the same time the pin 147 is engaged by the lower end of the slot 148 and the lower valve stem 175 and lower valve assemblage are likewise lifted out through the filler port 185. To reinsert the valve assemblage, it is only necessary to perform the reverse operation, being sure that the lower valve flange 136 enters into the enlargement 221 of the lower valve bore 124 and that the annular member 223 enters into the central bore 222 of the upper end plate 106 and to then seat the filler port plug firmly in place.

Various other modifications of the dispenser can be employed or incorporated in the modifications described in detail, if desired, without departing from the spirit of the invention. Thus, a conventional drain plug can be inserted in the bottom of the apparatus, if desired, to facilitate washing and draining of the apparatus and, in instances where it may be thought necessary, a safety plug of any convenient or conventional design can be incorporated, usually at a point above the level of liquid in the filled apparatus, to guard against bursting of the container should the pressure therein exceed the working pressure of the container through inadvertence or accident. Generally, however, these precautions are unnecessary.

The effective volumes of the gas chamber 23, the beverage chamber 21 and the diaphragm chamber 22 can be varied over wide ranges depending upon the properties of the particular beverage which is to be dispensed from the apparatus, upon the pressure which is intended to prevail in the freshly charged gas chamber 23 and, to some extent, upon the particular degree of accuracy with which the optimum degree of carbonation of the beverage is to be maintained. Although, as noted elsewhere, a suitable working arrangement is to provide a gas chamber 23 which is large enough to contain the requisite amount of carbon dioxide when compressed to the pressure of roughly from 200 to 600 lbs. per sq. inch., it is entirely within the scope of the present invention to construct the apparatus to involve charging of the gas chamber with carbon dioxide at a pressure considerably above or considerably below this pressure. Thus it is entirely within the scope of the invention to construct the gas chamber 23 with sufficiently heavy walls and of suitably small size so that it can even be charged with liquid carbon dioxide under the pressure of the latter normally prevailing at the temperatures involved. Such procedure offers the difficulty of regulating the release of carbon dioxide into the beverage chamber with sufficient smoothness to maintain a desirably constant pressure therein at a given temperature but, provided a suitable valve-releasing means is employed, this modification offers the very great advantage that it provides for a maximum utilization of the entire volume of the outer container for the beverage which is to be dispensed. On the other hand, it may at times be desirable to construct the apparatus with a gas chamber 23 which is sufficiently large with respect to the volume of the outer container to require pressuring it to a pressure considerably less than that mentioned earlier as one possibility. Such modification, of course, decreases the effective volume of the beverage chamber for the beverage which is to be dispensed, but at the same time it leads to a lower working pressure in the gas chamber and for this reason may sometimes contribute to the employment of a less costly and somewhat more accurate gas release valve arrangement than might otherwise be the case.

Strictly speaking, the actual amount of carbon dioxide introduced into the gas chamber should be as nearly as possible just that required to maintain the dispensing pressure in the beverage chamber at the dispensing temperature until all of the beverage has been dispensed. Any further quantity of carbon dioxide introduced into the gas chamber is unnecessary and uneconomical. The charging of the gas chamber with too great a quantity of carbon dioxide may lead to an undesirably prolonged "blow" through the dispensing valve, especially from the modification of FIGURE 2, when the beverage has all been dispensed but, aside from the matter of economy, is otherwise not particularly disadvantageous. In gauging the amount of carbon dioxide which is to be used, it should be remembered that the pressure in the gas chamber itself will remain at least as great as that in the beverage chamber and that this will also be true of the pressure in the regulating chamber when the latter is charged with a portion of the beverage itself and this portion is dispensed. Consequently the volume of the gas chamber and, in the instance mentioned, the volume of the regulating chamber should be added to the volume of the beverage chamber in calculating the pressure to which the gas chamber should be charged. For utmost accuracy, the fact that the gas in the vapor space in contact with the beverage will be a mixture of carbon dioxide and water vapor, the proportions of which will be determined by their equilibrium partial pressures between the gaseous and liquid beverage phases at the dispensing temperature and pressure, should also be considered. However, the partial pressure of water vapor from the carbonated beverage is usually quite small compared with that of carbon dioxide and can generally be neglected without serious consequences.

Practically speaking, it is often preferable, rather than to calculate accurately the pressure to which the gas chamber should be charged, to calculate this value only roughly and to then fill a series of dispensers and charge the gas chambers at the same temperature to differing pressures in the neighborhood of the roughly calculated value. Upon dispensing the beverage in turn from the several containers it will be readily apparent to what pressure the gas chambers should be charged during subsequent fillings at the same temperature. Such an empirical procedure is entirely practical and satisfactory.

Although it is contemplated that the gas chamber of the invention will generally be charged with carbon dioxide, especially when it is used for the dispensing of a carbonated beverage, it is entirely possible that it can be charged with other gaseous substances when the occasion demands or permits. Even in the case of carbonated beverages which are not deteriorated by prolonged contact with air, so long as they are maintained under the required pressure, it is entirely conceivable that the gas chamber could be charged with compressed air rather than with carbon dioxide with almost equally satisfactory results. Should contact of the beverage with the oxygen of the air preferably be avoided, the gas chamber can be charged with compressed nitrogen, helium or other inert gas. Similarly, in the case of liquid foodstuffs the gas chamber can be charged with nitric oxide, which is generally considered to be innocuous when in contact with foodstuff. Employing gases other than carbon dioxide for the dispensing of carbonated beverages, due consideration should, of course, be given to the partial pressures of carbon dioxide and the other gas in the vapor space above the beverage remaining in the dispenser. In general, however, it is advisable to charge the gas chamber 23 with the same gas, carbon dioxide or otherwise, with which the beverage or other product to be dispensed is charged.

Considerable latitude in the volume of the regulating chamber with respect to the volume of the beverage chamber is possible. Generally speaking, the accuracy with which the degree of carbonation of the beverage in the beverage chamber is maintained will be greater the greater the relative volume of the regulating chamber and the greater the area of the flexible diaphragm and will be less the greater the inherent resistance to flexing offered by the diaphragm and the greater the actual force required to open the gas-release valve sufficiently to allow gas to flow from the gas chamber into the beverage chamber. In instances where the regulating liquid is a portion of the carbonated beverage itself, the regulating chamber can be relatively large to insure a high degree of accuracy in maintaining the degree of carbonation of the beverage without decreasing the effective capacity of the dispenser appreciably. When another regulating liquid, e.g. carbonated water, is used, the volume occupied by the regulating chamber decreases the useful capacity of the dispenser for beverage by an equal amount. In such instances, careful consideration should be given to designing the dispenser so as to maintain the desired degree of carbonation of the beverage using a regulating chamber of as small volume as convenient to operate the gas-release valve satisfactorily. Using a gas-release valve seat, such as the seat 92 of FIGURE 3, which is of as small area as conveniently possible will also contribute to the more accurate control of the degree of carbonation of the beverage, particularly when the gas chamber is charged to a relatively high pressure, since less force will be required to open the valve than would be the case with a larger valve seat.

Although the invention has been described with particular reference to a portable dispenser for carbonated beverages, it should be noted that the use of barrels and kegs of a generally "nonportable" nature comprising features of the invention for the transportation and dispensing of such beverages offers numerous advantages over the procedures presently employed. Thus the manufacturer of a carbonated beverage which is supplied to a commercial establishment in the usual kegs or barrels is never sure that his product is dispensed with the optimum degree of carbonation since the control of the degree of carbonation is left entirely to the discretion and competence of the proprietor of the establishment. If the proprietor maintains the correct carbon dioxide pressure in the container for one temperature but actually dispenses the beverage at another temperature, the degree of carbonation of the beverage when served will be different from its degree of carbonation at the time it was received in the unopened barrel or keg at the establishment. Under such conditions the customer is, therefore, served beverage which is improperly carbonated and is forced to judge the quality of the beverage accordingly, and often forms an unfavorable opinion of the particular beverage concerned. In instances, however, where the keg or barrel is constructed according to the principles of this invention and charged correctly by the manufacturer with beverage and carbon dioxide, the owner of an establishment where the beverage is served has no convenient way of tampering with the degree of carbonation of the beverage and the beverage invariably reaches the consumer is the precise form intended by the manufacturer. A customer is thus essentially prevented from judging a beverage adversely due to incompetence or carelessness of the proprietor of the establishment where he obtains the beverage. At the same time, the proprietor avoids the inconvenience and expense of purchasing and maintaining his own pressuring system for the containers.

The dispenser of the invention has been illustrated and described with special reference to valves for closing various of the ports, e.g., the ports 123, 124, 192 and 222, which comprise essentially a flat plate or flange which seats on a flat section of the port-containing member around the port, a suitable gasket or valve facing generally being interposed between the valve and seat to assist in providing a tight seal. In choosing the valve facing material, due consideration should, of course, be given to the general suitability of the material chosen. Thus it should be of suitable hardness and flexibility to serve as required and should not be capable of being softened or attacked by, or of imparting any undesirable taste or odor to, the beverage or other liquid being dispensed. It should, in most cases, be capable of being heat-sterilized, e.g., with steam, without permanent distortion. Numerous products are available from which such valve facings can be fashioned, including certain grades of nylon, polyethylene, and other substances. The invention is not limited to the use of any one substance for valve facings.

Furthermore, the invention is not limited to the particular kind of valve referred to in the preceding paragraph but contemplates the employment of any suitable sort of valves, all of which need not be of the same type, which will enable the apparatus to function in the way described. Thus ball valves, ground metal-to-metal valves and other suitable types may be used in place of one or more of the flange-type valves illustrated in the drawing. Also, the gas release valve through which gas is released from the gas chamber into the beverage chamber can be of any suitable type which requires a suitably small amount of force to open it and which, when open, allows the escape of the gas at a suitably slow rate to avoid surging and overpressuring of the beverage chamber. Thus the gas relief valve comprising the ball 91 can be replaced by a suitable needle valve, by an electrically operated valve, as indicated previously, or by any other valve of suitable type and size.

Although the invention has been illustrated and described with respect to a modification in which the gas chamber is located principally within the outer container and thus projects into the beverage chamber, it should be mentioned that the invention contemplates other modifications wherein the gas chamber is located principally outside the beverage chamber and even principally outside the confines of the main container, e.g., outside the container 11 of FIGURE 1. Thus the gas chamber, since it need not necessarily be in heat-interchange relationship with the contents of the beverage chamber, can be located at any convenient place provided only that it is associated with the container in such a way as to be portable therewith as a unit and to provide for supplying gas from the chamber to the beverage chamber as required. Thus, referring to the modification of FIGURE 2, the gas chamber can be located in the space above the filler plate 18 and within the confines of the cover 13, the cover being dimensioned to accommodate the chamber in such a location. The gas chamber itself can be dimensioned in any suitable way to enable it to be accommodated at the place desired. Generally speaking, the location and configuration of the gas chamber will be governed largely by cost and designing considerations rather than by any relationship which must be preserved between the gas chamber and the other parts of the apparatus so long as the apparatus is arranged so that it will function satisfactorily to give the results hereinbefore described.

I claim:

1. In apparatus suitable for dispensing a carbonated beverage therefrom, a container having therein a beverage chamber adapted to contain a carbonated beverage and to have successive portions of the beverage dispensed therefrom; a gas chamber associated with the container adapted to contain a supply of carbon dioxide under a pressure greater than the pressure exerted by a carbonated beverage in the beverage chamber; conduit means including a gas-release valve communicating at one of its ends with the gas chamber and at its other end with the beverage chamber whereby carbon dioxide can be released from the gas chamber into the beverage chamber; a regulating chamber associated with the beverage chamber to provide for heat interchange between the contents of the beverage chamber and the contents of the regulating chamber; valved communication means between the regulating chamber and the beverage chamber normally closed during dispensing of at least a major part of a carbonated beverage from the beverage chamber but adapted to be open during introduction of a carbonated beverage into the beverage chamber to provide for introduction of a part of the introduced beverage into the regulating chamber; a wall common to the regulating chamber and to the beverage chamber comprising a flexible diaphragm adapted to flex in the direction of the beverage chamber when the pressure in the beverage chamber is substantially less than the pressure in the regulating chamber; and mechanical means connecting the diaphragm and the gas-release valve whereby, when the diaphragm flexes substantially in the direction of the beverage chamber, the gas-release valve is caused to open.

2. In apparatus suitable for dispensing a carbonated beverage therefrom, a container having therein a beverage chamber adapted to contain a carbonated beverage and to have successive portions of the beverage dispensed therefrom; a gas chamber associated with the container adapted to contain a supply of carbon dioxide under a pressure greater than the pressure exerted by a carbonated beverage in the beverage chamber; conduit means including a gas-release valve communicating at one of its ends with the gas chamber and at its other end with the beverage chamber whereby carbon dioxide can be released from the gas chamber into the beverage chamber; a regulating chamber associated with the beverage chamber to provide for heat-interchange relationship between the contents of the regulating chamber and the contents of the beverage chamber; upper and lower regulating chamber valves adapted, during the time the beverage chamber is being filled with a carbonated beverage, to be open whereby carbonated beverage can flow into the regulating chamber and adapted, during the time at least a major part of a beverage contained in the beverage chamber is being dispensed therefrom, to be closed whereby a portion of the beverage retained in the regulating chamber remains sealed therein and serves as a regulating fluid; a wall common to the regulating chamber and to the beverage chamber comprising a flexible diaphragm adapted to flex in the direction of the beverage chamber when the pressure in the beverage chamber is substantially less than the pressure in the regulating chamber; and means responsive to the flexing of the diaphragm in the direction of the beverage chamber to cause the gas-release valve to open.

3. Apparatus as claimed in claim 2 wherein the regulating chamber is located substantially entirely within the confines of the beverage chamber.

4. Apparatus as claimed in claim 2 including means operable when at least the major part of a beverage contained in the beverage chamber has been dispensed therefrom to open the lower regulating chamber valve whereby a portion of beverage contained in the regulating chamber can flow therefrom into the beverage chamber and be dispensed from the beverage chamber along with beverage remaining therein.

5. Apparatus as claimed in claim 2 including float means in the beverage chamber operable when the beverage chamber is filled to only a minor proportion of its capacity with carbonated beverage to open the lower regulating chamber valve whereby beverage contained in the regulating chamber can flow therefrom into the beverage chamber.

6. Apparatus as claimed in claim 2 wherein the upper and lower regulating chamber valves comprise a unitary assemblage adapted to be removed from the container while a carbonated beverage is being introduced into the beverage chamber.

7. In apparatus suitable for dispensing a carbonated beverage therefrom, a container having therein a beverage chamber adapted to contain a carbonated beverage and to have successive portions of the beverage dispensed therefrom; a gas chamber associated with the container adapted to contain a supply of carbon dioxide under a pressure greater than the pressure exerted by a carbonated beverage in the beverage chamber; conduit means including a gas-release valve communicating at one of its ends with the gas chamber and at its other end with the beverage chamber whereby carbon dioxide can be released from the gas chamber into the beverage chamber; a regulating chamber in association with the beverage chamber to provide for heat interchange between the contents of the regulating chamber and the contents of the beverage chamber; normally closed upper and lower regulating chamber valves to provide for upper and lower communications, respectively, between the beverage chamber and the regulating chamber; a normally closed filler valve in the wall of the container adapted to be opened by the insertion of a beverage filler pipe through the port of the filler valve; means responsive to the opening of the filler valve to cause the upper regulating chamber valve to open whereby when a beverage is introduced by way of a filler pipe through the filler valve into the beverage chamber a portion of the beverage can flow into the regulating chamber and serve as a regulating liquid subsequent to withdrawal of the filler pipe and the closing of the filler valve and upper regulating chamber valve; a wall common to the regulating chamber and the beverage chamber comprising a flexible diaphragm adapted to flex in the direction of the beverage chamber when the pressure in the beverage chamber is substantially less than the pressure in the regulating chamber; and means responsive to the flexing of the diaphragm in the direction of the beverage chamber to cause the gas-release valve to open.

8. Apparatus as claimed in claim 7 wherein the filler valve and the upper and lower regulating chamber valves comprise a unitary assemblage adapted to be removed from the container through a suitable, normally closed port.

References Cited by the Examiner

UNITED STATES PATENTS

| | | | |
|---|---|---|---|
| 575,932 | 1/97 | Nageldinger | 222—399 |
| 1,412,321 | 4/22 | Tate | 222—399 |
| 1,959,815 | 5/34 | Corcoran | 222—399 X |
| 2,085,956 | 7/37 | Clarke et al. | 222—399 X |
| 2,471,328 | 5/49 | Jones | 137—403 |
| 2,501,611 | 3/50 | Nicholson | 222—399 X |
| 2,812,109 | 11/57 | Wentz | 222—399 X |

RAPHAEL M. LUPO, *Primary Examiner.*

LOUIS J. DEMBO, LAVERNE D. GEIGER, *Examiners.*

Dedication 3,200,991.—*Lindley E. Mills*, Kalamazoo, Mich. BEVERAGE DISPENSER. Patent dated Aug. 17, 1965. Dedication filed June 26, 1968, by the inventor.

Hereby dedicates said patent to the Public.

[*Official Gazette November 19, 1968.*]